United States Patent

[11] 3,577,028

[72] Inventor Harry Goldie
Randallstown, Md.
[21] Appl. No. 862,203
[22] Filed Sept. 30, 1969
[45] Patented May 4, 1971
[73] Assignee the United States of America as represented by the Secretary of the Air Force

[54] CHLORINE-OXYGEN TRANSMIT-RECEIVED STAGE TO OPERATE AT SHORT PULSE WIDTHS, LOW PULSE REPETITION FREQUENCIES, AND WIDE DUTY CYCLES
1 Claim, 7 Drawing Figs.

[52] U.S. Cl. .......... 313/223, 315/39, 333/13
[51] Int. Cl. .......... H01j 17/20
[50] Field of Search .......... 313/223; 333/13

[56] References Cited
UNITED STATES PATENTS
2,637,780 5/1953 Longacre .......... 333/13

*Primary Examiner*—Raymond F. Hossfeld
*Attorneys*—Harry A. Herbert, Jr. and Robert Kern Duncan

ABSTRACT: The invention consists of a mixture of chlorine gas, ($Cl_2$), and oxygen gas, ($O_2$), to be used in place of pure $Cl_2$ gas in transmit-receive stages for stable operation at shorter radio frequency pulse widths, lower pulse repetition frequencies and wider duty cycles than was previously possible with $Cl_2$ gas alone. The mixture reduces the power necessary for ionization of the gas in the stage which decreases the random amplitude modulation on the leakage envelope and reduces the total spike energy output to the receiver making it possible to use more sensitive receivers without danger of their being damaged by spike leakage. The invention also provides a much faster recovery time than is possible with a mixture of $Cl_2$ gas and noble gas which yields the same leakage as that of the invention.

INVENTOR.
HARRY GOLDIE
BY Harry A. Herbert, Jr.
ATTORNEY

INVENTOR.
HARRY GOLDIE

BY

ATTORNEY

INVENTOR.
HARRY GOLDIE
BY Harry A. Herbert Jr
ATTORNEY

CHLORINE-OXYGEN TRANSMIT-RECEIVED STAGE TO OPERATE AT SHORT PULSE WIDTHS, LOW PULSE REPETITION FREQUENCIES, AND WIDE DUTY CYCLES

BACKGROUND OF THE INVENTION

1. Field of the Invention

Gas mixtures in TR tubes.

2. Prior Art

Chlorine gas is used in TR stages in order to achieve extremely short recovery periods. Such stages are exemplified by U.S. Pat. No. 3,208,012 issued to G. Klein. The use of pure chlorine gas is not satisfactory where there is low pulse repetition frequency as there is an unstable threshold of breakdown which is visible as an amplitude modulation on the spike when the detected output leakage envelope is viewed on a cathode ray oscilloscope.

The device bearing U.S. Pat. No. 3,268,757 issued to J. D. Woermbke used a noble gas as the ionizing element and chlorine as the attaching agent for low incident radio frequency power levels. The addition of sufficient noble gas to chlorine to eliminate the amplitude modulation on the spike and lower the spike to the level obtained with the mixture of the present invention lengthens the recovery time to several microseconds past that of this invention.

SUMMARY OF THE INVENTION

The invention consists of a mixture of chlorine gas, ($Cl_2$), and oxygen gas, ($O_2$), which when placed in a transmit-receive stage reduces the firing power, decreases the random amplitude modulation on the leakage envelope, and reduces the total spike energy output from that obtained with the use of pure $Cl_2$ gas, while not significantly increasing the recovery time beyond that of pure $Cl_2$ gas. The result is a new capability for stable operation at short radio frequency pulse widths, low pulse repetition frequencies and wide duty cycle ranges.

DESCRIPTION OF THE PREFERRED EMBODIMENTS

Figure 4:
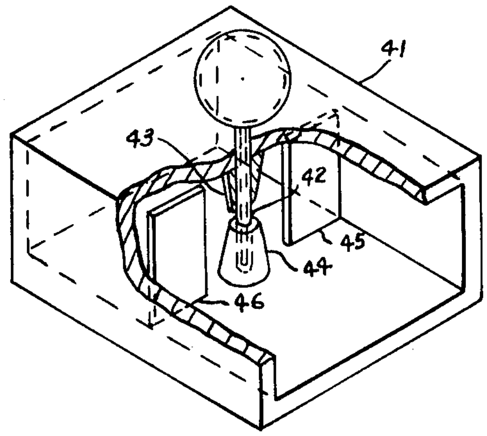
FIG. 4 is a pictorial representation of a typical embodiment of a transmit-receive stage of the invention.

The invention consists of a transit-receive stage having a capillary tube containing a mixture of chlorine gas and oxygen gas. A representative, conventional, transmit-receive stage is set forth in U.S. Pat. No. 3,208,012 previously referred to and pictorially diagrammed in FIG. 4. The T–R (transmit-receive) switching action is automatically obtained by the presence of transmitting electromagnetic energy in the waveguide 41 ionizing the gas contained in the capillary tube 42 which extends from within the bore of upper capacitive electrode member 43 to within the bore of lower capacitive electrode member 44. The capacitance of these electrode members and the inductance of plate members 45 and 46 form the resonant circuit of the T–R switch. In experimenting with various gases and mixtures of gases in transmit-receive stages operating at short radio frequency pulse widths, low pulse repetition frequencies, and wide duty cycles, it was found that a mixture of $O_2$ gas and $Cl_2$ gas decreased the spike leakage of the stages from that obtained with pure $Cl_2$ gas. The preferred mixture was obtained by adding increments of oxygen gas to chlorine gas noting the decrease in amplitude modulation and spike leakage until the recovery time of the mixture began to exceed that of pure chlorine gas. For a mixture of chlorine gas and oxygen gas the optimal results of amplitude modulation elimination and minimum spike leakage without an increase in recovery time for short radio frequency pulse widths, low pulse repetition frequencies and wide duty cycles were found to occur where there were approximately equal torr of $Cl_2$ gas and $O_2$ gas.

The addition of $O_2$ gas to the $Cl_2$ gas reduces the power necessary to ionize the gas in the stage which results in reduction of amplitude modulation and spike energy leakage.

FIGS. 1*a*, 1*b*, 2*a* and 2*b* are plots of the experimentally obtained amplitude modulation and spike leakage of a transmit-receive stage. Except for those factors which are specifically mentioned as having been changed, all operating conditions remained constant throughout the experiments. The incident transmitter signal to the stage which resulted in the spike leakage plotted in FIGS. 1*a* and 1*b* was an approximately 200 watt signal with an operating signal frequency of 3gHz, a radio frequency pulse width of one-half microsecond, a duty cycle of 5 percent and a pulse repetition frequency of 100 kHz. The spike leakage shown in FIG. 1 1*a* occurred when the stage contained pure $Cl_2$ gas at a pressure of approximately 4 torr. The spike leakage of this stage varied from a minimum of approximately 10 watts to a maximum of approximately 25 watts. The dotted portion of the FIG. which raises to the 25 watt level corresponds to the amplitude modulation on the spike. The spike leakage shown in FIG. 1*b* occurred when the stage contained approximately 2 torr of $O_2$ gas and 2 torr of $Cl_2$ gas. The spike leakage of this stage stayed essentially constant at approximately 8.8 watts.

Figure 2A:
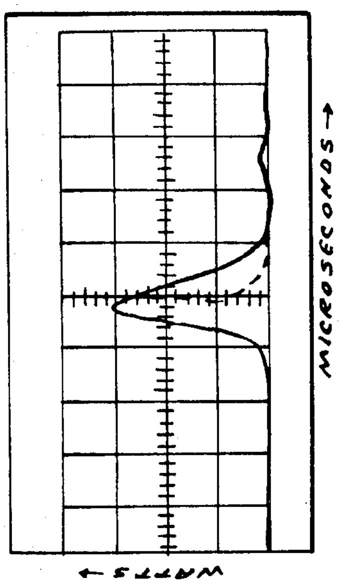
FIG. 2*a* is a plot of the spike leakage of the same stage using only $Cl_2$ gas, but operating at a pulse repetition frequency of 50 kHz.
Figure 2B:
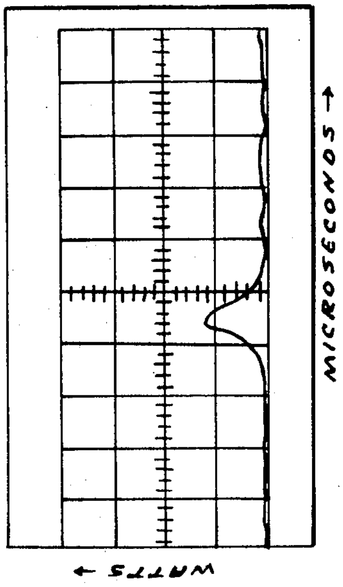
FIG. 2*b* is a plot of the spike leakage of the same stage and operating at the same pulse repetition frequency as in FIG. 2*a* but containing a mixture of $Cl_2$ gas and $O_2$ gas rather than pure $Cl_2$ gas.
Figure 1A:
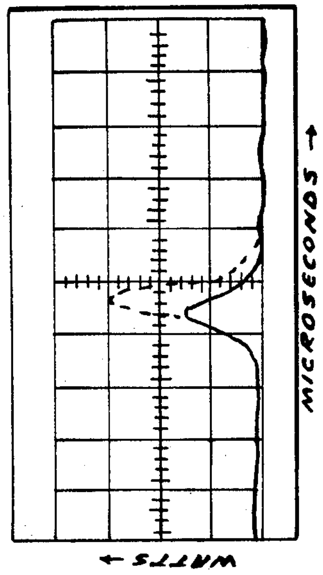
FIG. 1*a* is a plot of the spike leakage of a typical transmit-receive stage using only $Cl_2$ gas and operating at a pulse repetition frequency of 100 kHz.
Figure 1B:
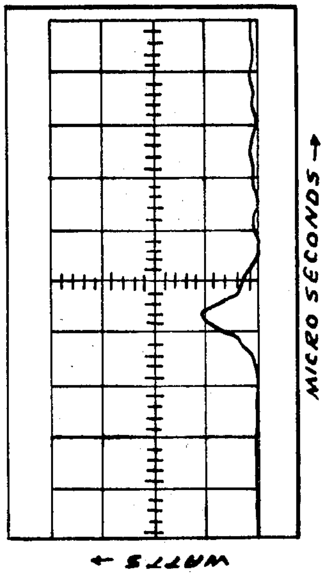
FIG. 1*b* is a plot of the spike leakage of the same stage but containing a mixture of $Cl_2$ gas and $O_2$ gas rather than pure $Cl_2$ gas.

The incident transmitter signal to the stage which resulted in the spike leakage plotted in FIGS. 2*a* and 2*b* was the same as that used for FIGS. 1*a* and 1*b*, except that it had a duty cycle of 2.5 percent and a pulse repetition frequency of 50 kHz. The spike leakage shown in FIG. 2*a* occurred when the stage contained pure $Cl_2$ gas at a total pressure of approximately 4 torr. The spike leakage of this stage varied from a minimum of approximately 10 watts to a maximum of approximately 25 watts. The spike leakage shown in FIG. 2*116 b* occurred when the stage contained approximately 2 torr of $O_2$ gas and 2 torr of $Cl_2$ gas. The spike leakage of this stage stayed essentially constant at approximately 9.2 watts.

A total pressure of 4 torr was used as this pressure yields optimal results for an operating signal frequency of 3gHz. Lower pressure yields less spike leakage but longer recovery time, while higher total pressure yields faster recovery time but greater spike leakage. The optimum total pressure will vary with the operating signal frequency. The higher the frequency, the greater the total pressure required for optimal results.

Figure 3A:
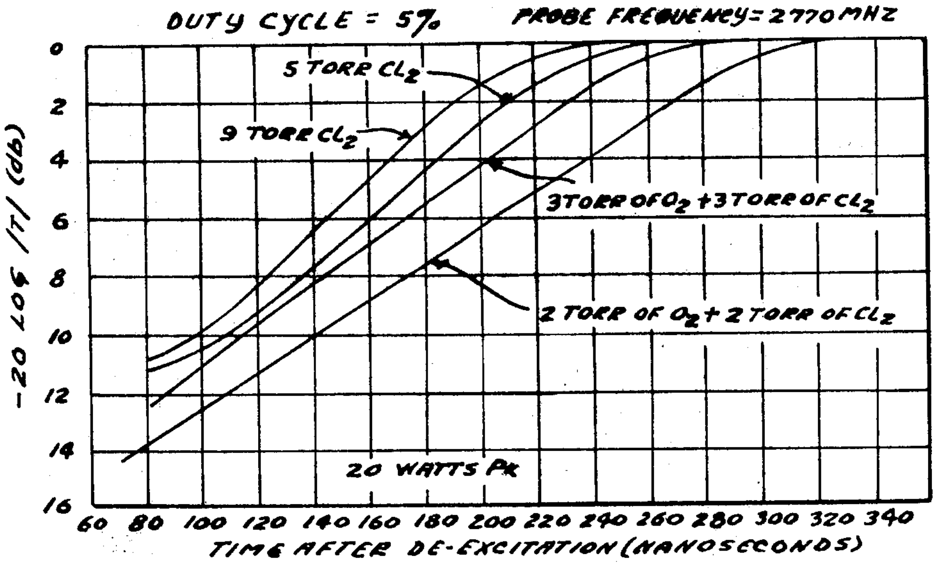
FIG. 3*a* is a plot of the recovery characteristics of transmit-receive stages using various pressures of $Cl_2$ gas and of mixtures of $Cl_2$ and $O_2$ gases after a 20 watt peak transmitter signal pulse.
Figure 3B:
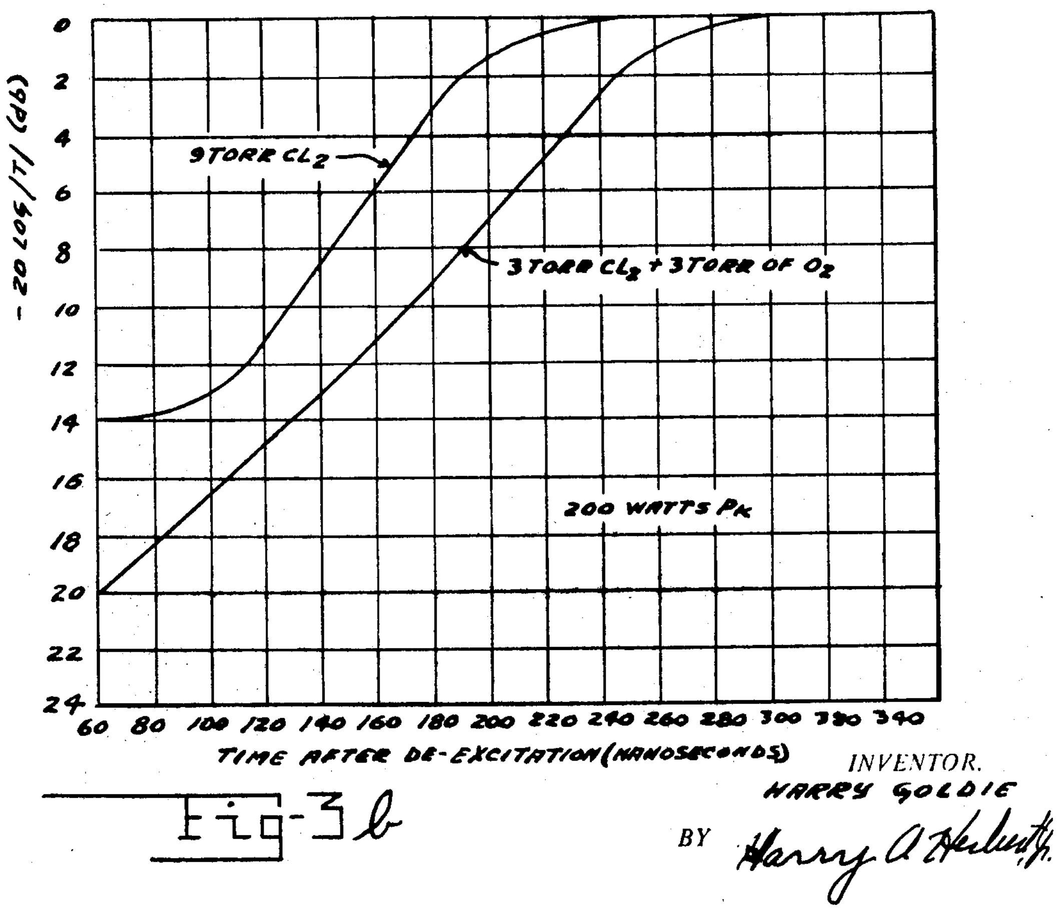
FIG. 3*b* is a plot of the recovery characteristics of a transmit-receive stage when using $Cl_2$ gas alone and when using a mixture of $Cl_2$ and $O_2$ gases after a 200 watt peak transmitter signal pulse.

FIGS. 3*a* and 3*b* are plots of experimental data which show that the recovery times for the $Cl_2$–O2 $O_2$ stages, where such stages contain approximately equal torr of $Cl_2$ gas and $O_2$ gas, differ by only a few nanoseconds from the recovery times of stages containing pure $Cl_2$ gas. In both FIGS. 3*a* and 3*b* the decrease in the attenuation of a low wattage constant input signal with a frequency of 2770 MHz is shown as a function of the time after deexcitation by the transmitter pulse. The transmission of the input signal expressed as $-20\ 1n\ /T/$, where the transmission coefficient /T/ is the ratio of the attenuated input signal to the incident input signal, is plotted as a function of time after the fall of the transmitter pulse both for chlorine and for chlorine-oxygen mixtures.

FIG. 3*a* shows the recovery characteristics following a 20 watt transmitter pulse with a 5 percent duty cycle, and FIG. 3*b* shows the recovery characteristics after a 200 watt transmitter pulse with a 5 percent duty cycle.

The reduction of spike leakage with essentially no loss of recovery time makes it possible to use much more sensitive receivers without danger of their being damaged by spike leakage.

The addition of enough noble gas to $Cl_2$ gas to produce the same spike leakage reduction obtained by the addition of $O_2$ gas to $Cl_2$ gas lengthens the recovery time of the mixture by several microseconds.

I claim:

1. The improvement in a T–R switch having a resonant circuit the capacitive portion of which includes two capacitive spaced-apart electrodes each having a bore extending thereinto and the said bores being in axial alignment, the said improvement comprising a capillary tube containing approximately equal torr of $Cl_2$ gas and $O_2$ gas, the said capillary tube extending from within the said bore of one electrode to within the bore of the other electrode.